(12) United States Patent
Jung et al.

(10) Patent No.: US 8,742,025 B2
(45) Date of Patent: Jun. 3, 2014

(54) ADHESIVE COMPOSITION AND POLARIZING PLATE COMPRISING THE SAME

(75) Inventors: Kyung Moon Jung, Pyeongtaek-Si (KR); Han Young Choi, Pyeongtaek-Si (KR); Ji Yeon Choi, Pyeongtaek-Si (KR)

(73) Assignee: Dongwoo Fine-Chem Co., Ltd., Jeollabuk-do (KR)

( * ) Notice: Subject to any disclaimer, the term of this patent is extended or adjusted under 35 U.S.C. 154(b) by 471 days.

(21) Appl. No.: 13/116,258

(22) Filed: May 26, 2011

(65) Prior Publication Data

US 2011/0293933 A1 Dec. 1, 2011

(30) Foreign Application Priority Data

May 28, 2010 (KR) ........................ 10-2010-0050156

(51) Int. Cl.
*C08K 5/04* (2006.01)
*C08F 16/12* (2006.01)
*C08F 220/68* (2006.01)
*B32B 7/02* (2006.01)

(52) U.S. Cl.
CPC ............... *C08F 16/12* (2013.01); *C08F 220/68* (2013.01); *C08K 5/04* (2013.01); *B32B 7/02* (2013.01)

USPC ....... 525/328.9; 525/55; 525/242; 525/330.3; 524/265; 524/401; 428/355 AC

(58) Field of Classification Search
USPC ....... 525/328.9, 55, 242, 330.3; 428/355 AC; 524/265, 401
See application file for complete search history.

(56) References Cited

U.S. PATENT DOCUMENTS 6,300,416 B1 * 10/2001 Okada et al. .................. 525/191
6,635,727 B1 * 10/2003 Koda et al. .................... 526/160

* cited by examiner

*Primary Examiner* — Kelechi Egwim
(74) *Attorney, Agent, or Firm* — The PL Law Group, PLLC

(57) ABSTRACT

Disclosed are an adhesive composition and a polarizing plate including the same and, more particularly, an adhesive composition including a vinyl-acrylate copolymer including a hydroxyalkylvinylether monomer as a repeating unit, a cross-linking agent, ionic solid, and a silane coupling agent and, in addition, a polarizing plate including the same. Such adhesive composition may have desired re-workability without decrease in durability caused by surface transfer of an ionic compound, and allow effective gelling of adhesive fraction, to thereby considerably reduce a curing period.

19 Claims, No Drawings

ADHESIVE COMPOSITION AND POLARIZING PLATE COMPRISING THE SAME

CROSS-REFERENCE TO RELATED APPLICATION

This application claims the benefit of Korean Patent Application No. 10-2010-0050156 filed on May 28, 2010, in the Korean Patent and Trademark Office, the disclosures of which are incorporated herein in their entirety by reference.

BACKGROUND OF THE INVENTION

1. Field of the Invention

The present invention relates to an adhesive composition.

2. Description of the Related Art

In general, a liquid crystal display device (LCD') has a liquid crystal panel including liquid crystal cells and at least two polarizing plates laminated to both sides of each liquid crystal cell.

The polarizing plate typically consists of an iodine-based polyvinyl alcohol polarizer and a protective film to protect both sides of the polarizer, and is combined with the liquid crystal cell through an adhesive (layer).

Such adhesive used to combine the polarizer with the liquid crystal cell must possess both durability such as heat resistance, heat/moisture resistance, etc., and re-workability. However, since characteristics of the adhesive to achieve such physical properties substantially oppose each other, these physical properties still have yet to be mutually satisfied.

In order to solve conventional problems described above, Japanese Patent Laid-Open Publication No. H10-044291 discloses use of an acrylic polymer having specific functional groups, as an adhesive resin. However, this method causes increase in adhesive strength at elevated temperature, thus having difficulty in attaining desired re-workability. Korean Patent Laid-Open Publication No. 2009-0055481 discloses a copolymer based on a monomer having 1 to 16 alkyl groups as well as a hydroxyl group-containing monomer, and an adhesive composition including styrene resin cross-linked to the copolymer.

Meanwhile, a process for combination of a polarizing plate with a liquid crystal cell may generate electrostatic discharge during peeling of a release film. Such electrostatic discharge may cause various problems including, for example: surface contamination of an optical part due to impurity adsorption; stains caused by distortion of liquid crystal orientation; damage of thin film transistor (TFT) circuits, or the like. Therefore, conventional methods generally adopt an addition of ionic compounds to an adhesive as an anti-static agent.

However, the anti-static agent based on ionic compounds moves toward a surface of the adhesive composition, in turn creating problems caused by decreased durability, such as bubbling on a bonded face between an adhesive layer and a liquid crystal cell, delamination, etc. Also, ionic compounds often inhibit gelling of the adhesive, to thereby entail difficulties in controlling, i.e., decreasing a curing period of the adhesive.

SUMMARY

According to an aspect of the present invention is to provide an adhesive composition which can simultaneously satisfy demands for desired anti-static properties and re-workability without decrease in durability due to surface transfer of ionic compounds used as an anti-static agent.

According to another aspect of the present invention is to provide an adhesive composition which does not inhibit gelling of adhesive even though an ionic compound is contained therein, so as to control a curing period and considerably decrease the same, thereby improving productivity.

According to another aspect of the present invention is to provide a polarizing plate having an adhesive layer laminated thereon, which consists of the adhesive composition described above.

According to an embodiment of the present invention, an adhesive composition, including: a vinyl-acrylate copolymer including a hydroxyalkylvinylether monomer represented by the following Formula 1 as a repeating unit; a cross-linking agent; ionic solid; and a silane coupling agent:

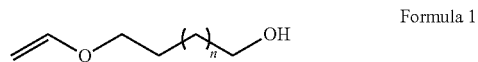

Formula 1

(wherein n is an integer ranging from 1 to 10).

With regard to the adhesive composition, the vinyl-acrylate copolymer may be a copolymer of an alkyl(meth)acrylate monomer having 4 to 12 carbon atoms and a hydroxyalkylvinylether monomer represented by the following Formula 1:

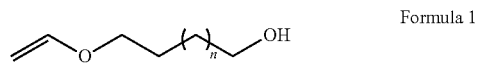

Formula 1

(wherein n is an integer ranging from 1 to 10).

The hydroxylalkylvinylether monomer represented by the above Formula 1 may be contained in an amount of 0.1 to 10 weight % (wt. %) relative to 100 wt. % of the vinyl-acrylate copolymer (in terms of solid content). Hereinafter, 100 wt. % of the vinyl-acrylate copolymer is in terms of solid content unless otherwise stated.

The hydroxylalkylvinylether monomer represented by the above Formula 1 may be at least one selected from the group consisting of 4-hydroxybutylvinyleter, 5-hydroxypentylvinylether, 6-hydroxyhexylvinylether, 7-hydroxyheptylvinylether, 8-hydroxyoctylvinylether, 9-hydroxynonylvinylether and 10-hydroxydecylvinylether.

The ionic solid may have a melting point of at least 40° C.

An embodiment of the present invention also provides a polarizing plate having an adhesive layer which consists of the adhesive composition.

DETAILED DESCRIPTION

According to embodiments of the present invention, there is provided an adhesive composition having excellent anti-static properties, and which is capable of considerably decreasing a curing period while simultaneously improving durability and re-workability, as well as a polarizing plate including the same.

Hereinafter, embodiments of the present invention will be described in more detail.

The adhesive composition according to an embodiment of the present invention may include a vinyl-acrylate copolymer containing a hydroxyalkylvinylether monomer represented by the following Formula 1 as a repeating unit, as well as a cross-linking agent, ionic solid and a silane coupling agent.

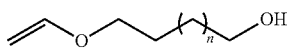
Formula 1

(wherein n is an integer ranging from 1 to 10).

In this regard, the vinyl-acrylate copolymer is an adhesive resin and may include a copolymer which has: an alkyl(meth) acrylate monomer having 4 to 12 carbon atoms; a hydroxyalkylvinylether monomer represented by the above Formula 1; and, optionally, a polymeric monomer having a cross-linkable functional group. Here, (meth)acrylate means both acrylate and methacrylate. That is, it can be acrylate or methacrylate.

The alkyl(meth)acrylate monomer having 4 to 12 carbon atoms described above is (meth)acrylate derived from aliphatic alcohols having 4 to 12 carbon atoms, and examples thereof may include; n-butyl(meth)acrylate, 2-butyl(meth) acrylate, t-butyl(meth)acrylate, pentyl(meth)acrylate, octyl (meth)acrylate, 2-ethylhexyl(meth)acrylate, nonyl(meth) acrylate, decyl(meth)acrylate, lauryl(meth)acrylate, and so forth, which is used alone or in combination with two or more thereof. Among these, for example, n-butylacrylate, 2-ethylhexylacrylate and/or mixtures thereof may be used.

Content of alkyl(meth)acrylate monomer having 4 to 12 carbon atoms is not particularly limited, but may range from 80 to 99.9 wt. %, preferably, 90 to 99.7 wt. %, relative to 100 wt. % of total monomers used for preparation of a vinyl-acrylate copolymer. If the content is less than 80 wt. %, adhesive strength is insufficient. On the other hand, when the content is 99.9 wt. %, or more cohesive strength may be deteriorated.

When the hydroxyalkylvinylether monomer is used for the adhesive composition of the present invention, durability and re-workability may be improved and a curing period may be controlled depending upon length of alkyl chains. This monomer is represented by the following Formula 1, in which the alkyl chain may have at least 4 carbon atoms:

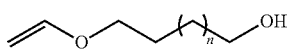
Formula 1

(wherein n is an integer ranging from 1 to 10).

The hydroxyalkylvinylether monomer represented by Formula 1 may be selected from 4-hydroxybutylvinylether, 5-hydroxypentylvinylether, 6-hydroxyhexylvinylether, 7-hydroxyheptylvinylether, 8-hydroxyoctylvinylether, 9-hydroxynonylvinylether and 10-hydroxydecylvinylether. Among these, 4-hydroxybutylvinyleter or 6-hydroxyhexylvinylether is preferably used. These monomers may be used alone or in combination with two or more of the foregoing monomers.

The hydroxylalkylvinylether monomer represented by Formula 1 may be contained in an amount of 0.1 to 20 wt. % relative to 100 wt. % of total monomers used for preparation of a vinyl-acrylate copolymer. For example, the above content may range from 0.1 to 10 wt. %, and more particularly, 0.3 to 7 wt. %, relative to 100 wt. % of total monomers. If the content is less than 0.1 wt. %, an ionic compound used as an anti-static agent may move toward a surface of the adhesive composition, in turn causing durability problems. On the other hand, when the content is 20 wt. % or more, durability may also be deteriorated due to decrease in adhesive strength.

The polymeric monomer having a cross-linkable functional group serves to give cohesion or adhesive strength through chemical bonding with a cross-linking agent and may include, for example, a polymeric monomer having a carboxyl group, a polymeric monomer having an amide group, a polymeric monomer having a tertiary amine group, and so forth.

Examples of the polymeric monomer having a carboxyl group may include: monobasic acids such as (meth)acrylic acid, crotonic acid, etc.; dibasic acids such as maleic acid, itaconic acid, fumaric acid, etc.; monoalkylesters of dibasic acids; succinic anhydride ring-opening polyaddition products for 2-hydroxyalkyl (meth)acrylate (having 2 or 3 carbon atoms); succinic anhydride ring-opening polyaddition products for polyoxyalkylene glycolmono(meth)acrylate (having 2 or 4 carbon atoms); compounds obtained by ring-opening polyaddition of succinic anhydride to caprolactone polyaddition products for 2-hydroxyalkyl (meth)acrylate (having 2 or 3 carbon atoms), or the like. Among them, for example, acrylic acid may be used.

Examples of the polymeric monomer having an amide group may include, (meth)acrylamide, N-isopropylacrylamide, N-tertiary butylacrylamide, etc. Among these, (meth) acrylamide is preferably used.

Examples of the polymeric monomer having a tertiary amine group may include, N,N-dimethylaminoethyl (meth) acrylate, N,N-diethylaminoethyl methacrylate, N,N-dimethylaminopropyl acrylate, etc.

Content of the polymeric monomer having a cross-linkable functional group is not particularly limited but may range from 0 to 10 wt. %, for example, 0 to 5 wt. %, relative to 100 wt. % of total monomers used for preparation of a vinyl-acrylate copolymer. If the content is 10 wt. % or more, adhesive strength may be reduced.

The vinyl-acrylate copolymer may have a weight average molecular weight (in terms of polystyrene) of 50,000 to 2,000,000, more particularly, 1,000,000 to 2,000,000, when measured by gel permeation chromatography (GPC).

A cross-linking agent may be used to conduct suitable cross-linkage of the vinyl-acrylate copolymer, so as to enhance cohesive strength. The cross-linking agent may include isocyanate compounds.

Examples of such isocyanate compounds may include; diisocyanate compounds such as tolylene diisocyanate, xylene diisocyanate, hexamethylene diisocyanate, 2,4-diphenylmethane diisocyanate, 4,4-diphenylmethane diisocyanate, isophorone diisocyanate, tetramethylxylene diisocyanate, etc.; and polyaddition products for polyhydric alcohol compounds such as trimethylolpropane of diisocyanate, etc.

In addition to the isocyanate compounds, at least one additional cross-linking agent selected from: melamine resins such as hexamethylol melamine, hexamethoxyl methylmelamine, hexabutoxy methylmelamine, etc.; polyepoxy compounds such as an epoxy compound consisting of bisphenol A and epichlorohydrin polycondensate; epoxy compounds including, for example, polyglycidylether of polyoxyalkylenepolyol, glycerin diglycidylether, glycerin triglycidylether, tetraglycidyl xylenediamine, or the like, may further be used.

The cross-linking agent may be contained in an amount of 0.1 to 15 wt. parts, for example, 0.1 to 5 wt. parts (in terms of solid content), relative to 100 wt. parts of the vinyl-acrylate copolymer. If the content is less than 0.1 wt. part, cohesive strength is decreased due to lack of degree for cross-linkage. As a result, an adhesive sheet may be ruptured or torn during re-peeling and/or physical properties such as cleavage may be deteriorated. If the content is 15 wt. parts or more, gel content is increased due to excessive cross-linkage while adhesive strength is reduced, in turn causing difficulties in simultaneously improving durability and re-workability.

The ionic solid functions as an anti-static agent and includes an ionic compound including a combination of anions and cations, which is a salt in a solid state at room temperature of 25° C.

The ionic solid is compatible with a vinyl-acrylate copolymer and an organic solvent, may allow an adhesive composition to retain transparency and an adhesive layer to have surface specific resistance of $6 \times 10^{10} \Omega/\square$ or less.

In addition, the ionic solid may have a melting point of 40° C. or more. If the melting point is less than 40° C., the ionic solid moves toward an end of a polarizing plate having an adhesive composition applied thereto and being dissolved therefrom. On the other hand, when the melting point is 40° C. or more, mobility of the ionic solid may be minimized thus eliminating dissolution problems.

The anions of ionic solid may be selected from a group consisting of imidazolium, pyridinium, alkylammonium, alkylpyrrolidium and alkyl phosphonium, and cations thereof may be selected from, $Cl^-$, $Br^-$, $I^-$, $AlCl_4^-$, $Al_2Cl_7^-$, $BF_4^-$, $PF_6^-$, $ClO_4^-$, $NO_3^-$, $CO_3^{2-}$, $CH_3COO^-$, $CF_3COO^-$, $CH_3SO_3^-$, $CF_3SO_3^-$, $(CF_3SO_2)_2N^-$, $(CH_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, $C_6H_5COO^-$, $(CF_3SO_2)(CF_3CO)N^-$, $OTf^-$ (trifluoromethane sulphonate), $OTs^-$ (toluene sulphonate), $OMs^-$ (methane sulphonate) and $BPh_4^-$ (tetraphenyl borate). The ionic solid may be used alone or in combination with two or more thereof.

A compound including imidazolium cations (i.e., imidazolium salt) may include, for example: 1,3-dimethylimidazolium chloride (a melting point of 125° C.); 1-butyl-2,3-dimethylimidazolium chloride (a melting point of 99° C.); 1-butyl-3-methylimidazolium bromide (a melting point of 78° C.); 1-butyl-3-methlylimidazolium chloride (a melting point of 65° C.); 1-butyl-1-(3,3,4,4,5,5,6,6,7,7,8,8,8-tridecafluorooctyl)-imidazolium hexafluorophosphate (a melting point of 120 to 121° C.); 1-ethyl-3-methylimidazolium bromide (a melting point of 74° C.); 1-ethyl-3-methylimidazolium chloride (a melting point of 80 to 84° C.); 1-ethyl-3-methylimidazolium hexafluorophosphate (a melting point of 61° C.); 1-ethyl-3-methylimidazolium iodide (a melting point of 79° C.); 1-ethyl-2,3-dimethylimidazolium chloride (a melting point of 181° C.); 1-methylimidazolium chloride (a melting point of 75° C.); 1,2,3-trimethylimidazolium methylsulfate (a melting point of 113° C.); 1-methyl-3-(3,3,4,4,5,5,6,6,7,7,8,8,8-tridecafluorooctyl)-imidazolium hexafluorophosphate (a melting point of 80° C.); 1-aryl-3-mthlylimidazolium chloride (a melting point of 55° C.); 1-benzyl-3-methylimidazolium chloride (a melting point of 70° C.); 1-benzyl-3-methylimidazolium hexafluorophosphate (a melting point of 136° C.); 1-benzyl-3-methylimidazolium tetrafluoroborate (a melting point of 77° C.), or the like.

A compound containing pyridinium cations (i.e., pyridinium salt) may include, for example: 1-butyl-3-methylpyridinium bromide (a melting point of 43° C.); 1-butyl-4-methylpyridinium bromide (a melting point of 137° C.); 1-butyl-4-methylpyridinium chloride (a melting point of 158° C.); 1-butylpyridinium bromide (a melting point of 104° C.); 1-butylpyridinium chloride (a melting point of 132° C.); 1-butylpyridinium hexafluorophosphate (a melting point of 75° C.); 1-hexylpyridinium hexafluorophosphate (a melting point of 45° C.); 1-octyl-4-methylpyridinium hexafluorophosphate (a melting point of 44° C.); 1-ethylpyridinium bromide (a melting point of 120° C.); 1-ethylpyridinium chloride (a melting point of 1140° C.), or the like.

A compound containing alkylammonium cations (i.e., alkylammonium salt) may include, for example: cyclohexyltrimethylammonium bis(trifluoromethanesulfonyl)imide (a melting point of 56° C.); tetra-n-butylammonium chloride (a melting point of 75° C.); tetrabutylammonium bromide (a melting point of 119° C.); tributylmethylamonium methylsulfate (a melting point of 62° C.); tetrabutylammonium bis(trifluoromethylsulfonyl)imide (a melting point of 94 to 96° C.); tetraethylammonium trifluoromethanesulfonate (a melting point of 161 to 163° C.); tetrabutylammonium benzoate (a melting point of 64 to 67° C.); tetrabutylammonium methanesulfate (a melting point of 78 to 80° C.); tetrabutylammonium nonafluorobuthanesulfate (a melting point of 50 to 53° C.); tetra-n-butylammonium hexafluorophosphate (a melting point of 246° C.); tetrabutylammonium trifluoroacetate (a melting point of 74 to 76° C.); tetrahexylammonium tetrafluoroborate (a melting point of 90 to 92° C.); tetrahexylammonium bromide (a melting point of 97° C.); tetrahexylammonium iodide (a melting point of 99° C.); tetraoctylammonium chloride (a melting point of 50 to 54° C.); tetraoctylammonium bromide (a melting point of 95 to 98° C.); tetraheptylammonium bromide (a melting point of 89 to 91° C.); tetrapentylammonium bromide (a melting point of 99° C.); n-hexadecyltrimethylammonium hexafluorophosphate (a melting point of 185° C.), or the like.

A compound containing alkylpyrrolidium cations (i.e., alkylpyrrolidium salt) may include, for example: 1-butyl-1-methylpyrrolidium bromide (a melting point of 160° C. or more); 1-butyl-1-methylpyrrolidium chloride (a melting point of 114° C. or more); 1-butyl-1-methylpyrrolidium tetrafluoroborate (a melting point of 152° C.), or the like.

A compound containing alkylphosphonium cations (i.e., alkylphosphonium salt) may include, for example: tetrabutylphosphonium broide (a melting point of 104° C.); tetrabutylphosphonium chloride (a melting point of 62 to 66° C.); tetrabutylphosphonium tetrafluoroborate (a melting point of 96 to 99° C.); tetrabutylphosphonium methanesulfonate (a melting point of 59 to 62° C.); tetrabutylphosphonium p-toluenesulfonate (a melting point of 54 to 57° C.); tributylhexadecylphosphonium bromide (a melting point of 57 to 62° C.), or the like.

The ionic solid may be contained in an amount of 0.01 to 5 wt. parts, for example, 0.1 to 4 wt. parts, relative to 100 wt. parts of the vinyl-acrylate copolymer (in terms of solid content). If the content is less than 0.01 wt. part, anti-static properties may be deteriorated. On the other hand, when the content is 5 wt. parts or more, ionic solids may be precipitated.

In order to improve adhesion of an adhesive composition to a substrate, a silane coupling agent may be further used and include any known compounds. Examples of the silane coupling agent may include; vinyltrimethoxysilane, vinytriethoxysilane, 3-glycidoxypropyl trimethoxysilane, 3-glycidoxypropyl triethoxysilane, 3-glycidoxypropyl methyldiethoxysilane, 3-mercaptopropyl trimethoxysilane, 3-acryloxypropyl trimethoxysilane, 3-methacryloxypropyl trimethoxysilane, 3-methacryloxypropyl triethoxysilane, 2-(3,4-epoxycyclohexyl)ethyl trimethoxysilane, 3-aminopropyl trimethoxysilane, N-2-(aminoethyl)-3-aminopropylmethyl dimethoxysilane, 3-triethoxysilyl-N-(1,3-dimethylbutylidene)propylamine, 3-chloropropyl trimethoxysilane, 3-isocyanatepropyl triethoxysilane, acetoacetylate silanes, or the like, which are used alone or in combination with two or more thereof.

Such silane coupling agent may be contained in an amount of 0.1 to 1 wt. part, relative to 100 wt. parts of the vinyl-acrylate copolymer (in terms of solid content). If the content is less than 0.1 wt. part, adhesive strength to a liquid crystal cell may be unnoticeably improved. When the content is 1 wt. part or more, re-workability may be deteriorated.

According to an embodiment of the present invention, the adhesive composition may additionally include at least one additive selected from adhesion enhancing resin, antioxidants, anti-corrosive agents, leveling agents, surface lubricants, dyes, pigments, defoaming agents, fillers, light stabilizers, etc., in order to control various properties such as adhesive strength, cohesive strength, viscosity, resilience, glass transition temperature, etc., depending upon requirements.

Since the adhesive composition prepared as described above includes a vinyl-acrylate copolymer containing a hydroxyalkylvinylether monomer represented by Formula 1, as a repeating unit, in which an alkyl chain has at least 4 carbon atoms, may have increased durability without bubbling or delamination due to surface transfer of an ionic compound used as an anti-static agent, while attaining good initial adhesion but preventing excessive increase in adhesive strength at high temperature and/or high humidity environments, to thereby enable the adhesive fraction to be completely removed from a substrate during re-peeling and ultimately obtain sufficient re-workability. Moreover, the adhesive composition may inhibit prevention of gelling caused by the ionic compound, thus considerably decreasing a curing period.

The adhesive composition of the embodiment of the present invention may be used to prepare an adhesive for a polarizing plate in order to allow combination of the polarizing plate with a liquid crystal cell, as well as an adhesive for a surface protective film. In particular, the inventive adhesive composition may be used for adhesion to a cycloolefin film. In addition, the adhesive composition may be used in manufacturing a protective film, a reflective sheet, an adhesive sheet for structures, an adhesive sheet for photographs, an adhesive sheet for indicating traffic lanes, optical adhesive products, an adhesive for electronic parts, commercially available adhesive sheet products, medical patches, and so forth.

The polarizing plate according to an embodiment of the present invention may have an adhesive layer laminated thereon, which includes the adhesive composition as described above.

A thickness of the adhesive layer may vary depending upon adhesive strength and, in general, may range from 3 to 100 μm, for example, 10 to 100 μm.

Such a polarizing plate may be applied to typical liquid crystal display devices and, more particularly, a polarizing plate having an adhesive layer laminated thereon may be used to fabricate a liquid crystal display device having a liquid crystal panel, which is formed by attaching the polarizing plate to at least one side of a liquid crystal cell.

Hereinafter, embodiments will be described to more concretely understand the present invention with reference to examples and comparative examples. However, it will be apparent to those skilled in the art that such embodiments are provided for illustrative purposes and various modifications and alterations may be possible without departing from the scope and spirit of the present invention, and such modifications and alterations are duly included in the present invention as defined by the appended claims.

EXAMPLES

Example 1

[1] Vinyl-Acrylate Copolymer

In a 1 L reactor equipped with a cooler to control temperature and enable nitrogen gas reflux, 99.5 wt. parts of n-butylacrylate (BA) and 0.5 wt. parts of 4-hydroxybutylvinylether (4-HBVE, WACO Chemical) were introduced, and 100 wt. parts of ethylacetate (EA) was added as a solvent thereto. Next, in order to remove oxygen, nitrogen gas was fed for 1 hour and saturated in the reactor, followed by maintaining a temperature of 62° C. After uniformly stirring the treated mixture, 0.07 wt. parts of azobisisobutyronitrile (AIBN) as a reaction initiator were added thereto, and then, the mixture was subjected to reaction for 8 hours to produce an acryl copolymer having a weight average molecular weight of at least 800,000.

[2] Adhesive Composition

To 100 wt. parts of the vinyl-acrylate copolymer prepared in the above [1] (in terms of solid content), 0.5 wt. parts of a tolylene diisocyanate polyaddition product of trimethylolpropane (TMP-TDI, COR-L, Nippon Polyurethane Industry) as a cross-linking agent, 2 wt. parts of 1-octyl-4-methylpyridinium hexafluorophosphate (IL-P-18-2, Koei Chemical) as an anti-static agent, and 0.3 wt. parts of 3-glycidoxypropyl trimethoxysilane (KBM-403, Shinetsu Chemical) as a silane coupling agent were added and diluted to a predetermined concentration, in consideration of coating properties, thus preparing an adhesive composition.

[3] Adhesive Sheet

The adhesive composition of [2] was applied to a silicon release agent-coated film to a thickness of 25 μm after drying the film, and dried at 100° C. for 1 minute to form an adhesive layer. Another release film was laminated on the formed adhesive layer, thus forming an adhesive sheet.

[4] Adhesive Coated Polarizing Plate

An iodine polarizing plate (with a thickness of 185 μm) having a polyvinylalcohol (PVA) polarizer and triacetyl cellulose (TAC) films laminated on both sides of the polarizer was used. After peeling the release film of the adhesive sheet formed in the above [3], the remaining adhesive layer was attached to one side of the prepared iodine polarizing plate, thus fabricating a final product, that is, an adhesive-coated polarizing plate. Such fabricated polarizing plate was stored at 23° C. at a humidity of 55% RH during a curing period.

Example 2

The same procedures described in Example 1 were repeated, except that 99 wt. parts of n-butylacrylate (BA) and 1 wt. part of 4-hydroxybutylvinylether (4-HBVE) were used in step [1].

Example 3

The same procedures described in Example 1 were repeated, except that 95 wt. parts of n-butylacrylate (BA) and 5 wt. parts of 4-hydroxybutylvinylether (4-HBVE) were used in step [1].

Example 4

The same procedures described in Example 1 were repeated, except that 99 wt. parts of n-butylacrylate (BA) and 1 wt. part of 6-hydroxyhexylvinylether (6-HHVE, WACO Chemical) were used in step [1].

Example 5

The same procedures described in Example 1 were repeated, except that 98.5 wt. parts of n-butylacrylate (BA), 1 wt. part of 4-hydroxybutylvinylether (4-HBVE) and 0.5 wt. part of acrylic acid (AA) were used in step [1].

Example 6

The same procedures described in Example 1 were repeated, except that 99 wt. parts of n-butylacrylate (BA) and 1 wt. part of 4-hydroxybutylvinylether (4-HBVE) were used in step [1], and COR-L used as a cross-linking agent in step [2] was replaced with a hexamethylene diisocyanate compound (COR-HXR, Nippon Polyurethane Industry).

Example 7

The same procedures described in Example 1 were repeated, except that 99 wt. parts of 2-ethylhexyl methacrylate (2-EHMA) instead of n-butylacrylate (BA), as well as 1 wt. part of 4-hydroxybutylvinylether (4-HBVE) were used in step [1].

Comparative Example 1

The same procedures described in Example 1 were repeated, except that 99 wt. parts of n-butylacrylate (BA) and 1 wt. part of 2-hydroxyethylacrylate (2-HEA) were used in step [1].

Comparative Example 2

The same procedures described in Example 1 were repeated, except that 95 wt. parts of n-butylacrylate (BA) and 5 wt. parts of 2-hydroxyethylacrylate (2-HEA) were used in step [1].

Comparative Example 3

The same procedures described in Example 1 were repeated, except that 98.5 wt. parts of n-butylacrylate (BA), 1 wt. part of 2-hydroxyethylacrylate (2-HEA) and 0.5 wt. parts of acrylic acid (AA) were used in step [1].

Comparative Example 4

The same procedures described in Example 1 were repeated, except that 99 wt. parts of n-butylacrylate (BA) and 1 wt. part of 2-hydroxyethylacrylate (2-HEA) were used in step [1], and COR-L used as a cross-linking agent in step [2] was replaced with a hexamethylene diisocyanate compound (COR-HXR, Nippon Polyurethane Industry).

Individual components of the adhesive compositions prepared in Examples and Comparative Examples and contents thereof are shown in TABLE 1. Here, content of individual components is expressed in parts by weight.

TABLE 1

| Section | Copolymer | | | | | | Cross-linking agent | | Ionic solid | Silane coupling agent |
| --- | --- | --- | --- | --- | --- | --- | --- | --- | --- | --- |
| | BA | 2-EHMA | 4-HBVE | 6-HHVE | 2-HEA | AA | COR-L | COR-HXR | IL-P-18-2 | KBM-403 |
| Example 1 | 99.5 | — | 0.5 | — | — | — | 0.5 | — | 2 | 0.3 |
| Example 2 | 99 | — | 1 | — | — | — | 0.5 | — | 2 | 0.3 |
| Example 3 | 95 | — | 5 | — | — | — | 0.5 | — | 2 | 0.3 |
| Example 4 | 99 | — | — | 1 | — | — | 0.5 | — | 2 | 0.3 |
| Example 5 | 98.5 | — | 1 | — | — | 0.5 | 0.5 | — | 2 | 0.3 |
| Example 6 | 99 | — | 1 | — | — | — | — | 0.5 | 2 | 0.3 |
| Example 7 | — | 99 | 1 | — | — | — | 0.5 | — | 2 | 0.3 |
| Comparative Example 1 | 99 | — | — | — | 1 | — | 0.5 | — | 2 | 0.3 |
| Comparative Example 2 | 95 | — | — | — | 5 | — | 0.5 | — | 2 | 0.3 |
| Comparative Example 3 | 98.5 | — | — | — | 1 | 0.5 | 0.5 | — | 2 | 0.3 |
| Comparative Example 4 | 99 | — | — | — | 1 | — | — | 0.5 | 2 | 0.3 |

BA: n-butylacrylate
2-EHMA: 2-ethylhexyl methacrylate
4-HBVE: 4-hydroxybutylvinylether
6-HHVE: 6-hydroxyhexylvinylether
2-HEA: 2-hydroxyethylacrylate
AA: acrylic acid
COR-L: tolylene diisocyanate polyaddition product of trimethylolpropane (Nippon Polyurethane Industry)
COR-HXR: hexamethylene diisocyanate compound (Nippon Polyurethane Industry)
IL-P-18-2: 1-octyl-4-methylpyridinium hexafluorophosphate (Koei Chemical)
KBM-403: 3-glycidoxypropyl trimethoxysilane (Shinetsu Chemical Experimental Example For adhesive-coated polarizing plates fabricated in the above Examples and Comparative Examples, physical properties were measured by the following methods and such measured results are shown in TABLE 2.

[1] Durability (Heat Resistance, Heat/Moisture Resistance)

Each of the adhesive-coating polarizing plate fabricated in the above Examples and Comparative Examples was cut into a size of 90 mm×170 mm and, after peeling a release film, the cut pieces were attached to both sides of a glass board (110 mm×190 mm×0.7 mm) such that optical adsorption axes were aligned perpendicular to each other, thus obtaining a specimen. In this regard, applied pressure was 5 kg/cm² and the present experimental example was conducted in a cleanroom to prevent generation of bubbles and/or impurities. Heat resistance was determined after leaving the specimen at 80° C. for 1,000 hours and observing whether bubbles are generated or film peeling occurred. For determining heat/moisture resistance, the specimen was left at 60° C. at a humidity of 90% RH for 1,000 hours, and it was observed whether bubbles were generated or film peeling occurred. Here, just before condition assessment, the test specimen was left at room temperature for 24 hours then observed. Such condition assessment was performed on the basis of the following standards.

[Assessment Standards]
◎: no bubble generation or film peeling
○: less than 5 bubbles or film peels
Δ: at least 5 to less than 10 bubbles or film peels
x: at least 10 bubbles or film peels

[2] Adhesive Strength (N/cm)

Each of the adhesive-coating polarizing plates fabricated in the above examples and comparative examples was cut into a size of 25 mm×100 mm and, after peeling a release film, the cut pieces were pressed and laminated on a glass board (Corning Inc.) at 0.25 MPa pressure, followed by treating the same in an auto-clave, thus obtaining a specimen. The formed specimen was left at 23° C. at a humidity of 50% RH for 24 hours (for measuring adhesive strength at room temperature), and then, at 50° C. at a humidity of 50% RH for 48 hours (for measuring adhesive strength at elevated temperature). Using a universal testing machine (UTM, Intron), adhesive strength was measured when peeling at a peel rate of 10 m/min and a peel angle of 180°. The measurement was performed at 23° C. at a humidity of 50% RH.

[3] Re-Workability

Each of the adhesive-coating polarizing plates fabricated in the above examples and comparative examples was cut into a size of 25 mm×100 mm and, after peeling a release film, the cut pieces were pressed and laminated on a glass board (#1737, Corning Inc.) at 0.25 MPa pressure, followed by treating the same in an auto-clave at 50° C. and 5 atms for 20 minutes, thus obtaining a specimen. The formed specimen was left in an oven at 80° C. for 10 hours, and then, stored at room temperature for 120 hours. From this specimen, an adhesive layer was peeled at a peel rate of 1.3 cm/sec (for determining heat resistant re-workability). Following this, the treated specimen was left in an oven at 60° C. at a humidity of 90% RH for 12 hours, and then, stored at room temperature for 120 hours. From this specimen, an adhesive layer was peeled at the same peel rate as described above (for determining heat/moisture resistant re-workability). According to the following standards, re-workability was assessed.

[Assessment Standards]
○: adhesive does not remain on a glass board and an adhesive layer is completely peeled from the glass board without rupture or tearing of a polarizing plate, thus demonstrating that both heat-resistant re-workability and heat/moisture-resistant re-workability are excellent.

x: adhesive remains on a glass board or a polarizing plate is torn or ruptured during peeling, thus demonstrating that either heat-resistant re-workability or heat/moisture-resistant re-workability is poor.

[4] Gel Content (%)

Each of the fabricated adhesive-coated polarizing plates was cured at 23° C. at a humidity of 65% RH for 3 days. To an iron net with 250 mesh (100 mm×100 mm) after precision weighing, about 0.25 g of an adhesive layer of the cured adhesive-coated polarizing plate was attached and covered to prevent gel leakage. After weight of the iron net was accurately measured using a precision weighing scale, the iron net was immersed in an ethylacetate solution for 3 days. Then, the immersed iron net was washed using a small amount of the ethylacetate solution and dried at 120° C. for 24 hours, followed by measuring weight thereof. Gel content was calculated from the measured weight by the following equation 1.

$$\text{Gel content (\%)} = \frac{(C-A)}{(B-A)} \times 100 \quad \text{Equation 1}$$

a. wherein A denotes weight of an iron net (g), B denotes weight of the iron net having an adhesive layer attached thereto (weight of adhesive, g) before immersion and drying, and C denotes weight of the iron net after immersion and drying (weight of gelled resin, g).

TABLE 2

| Section | Durability | | Adhesive strength | | Re-workability | Gel content at day 3 (%) |
| | Heat resistance (80° C., 1,000 hours) | Heat/moisture resistance (60° C., 90% RH, 1,000 hours) | Room temperature (25° C., 24 hours) | Elevated temperature (50° C., 48 hours) | | |
|---|---|---|---|---|---|---|
| Example 1 | ○ | ○ | 2.2 | 6.1 | ○ | 69 |
| Example 2 | ◎ | ○ | 1.7 | 6.8 | ○ | 73 |

TABLE 2-continued

| Section | Durability | | Adhesive strength | | Re-workability | Gel content at day 3 (%) |
|---|---|---|---|---|---|---|
| | Heat resistance (80° C., 1,000 hours) | Heat/moisture resistance (60° C., 90% RH, 1,000 hours) | Room temperature (25° C., 24 hours) | Elevated temperature (50° C., 48 hours) | | |
| Example 3 | ○ | ○ | 1.2 | 7.4 | ○ | 82 |
| Example 4 | ○ | ⊚ | 1.9 | 6.9 | ○ | 75 |
| Example 5 | ⊚ | ⊚ | 2.6 | 7.8 | ○ | 83 |
| Example 6 | ⊚ | ○ | 1.5 | 7.7 | ○ | 72 |
| Example 7 | ○ | ⊚ | 2.8 | 8.1 | ○ | 84 |
| Comparative Example 1 | Δ | X | 1.1 | 6.4 | ○ | 52 |
| Comparative Example 2 | Δ | ○ | 1.4 | 7.8 | X | 64 |
| Comparative Example 3 | ○ | Δ | 2.4 | 8.3 | X | 76 |
| Comparative Example 4 | ○ | Δ | 1.5 | 7.2 | ○ | 62 |

As apparent from the foregoing Tables, it was confirmed that polarizing plates fabricated using the adhesive compositions prepared in Examples 1 to 7, each of which includes a vinyl-acrylate copolymer containing a hydroxyalkylvinylether monomer as a repeating unit, as well as ionic solid, may have excellent durability and initial adhesion and prevent excessive increase in adhesive strength at high temperature and high humidity environments, thereby attaining excellent re-workability. Moreover, results of gel content at day 3 demonstrate that a curing period may be considerably decreased.

As apparent from the above description, an adhesive composition of the present invention includes a vinyl-acrylate copolymer containing a hydroxyalkyvinylether monomer as a repeating unit, in which an alkyl chain has at least 4 carbon atoms, to thereby exhibit excellent durability without bubbling or delamination caused by surface transfer of an ionic compound used as an anti-static agent and, at the same time, to attain sufficient re-workability because the foregoing adhesive composition may have other advantages such as favorable initial adhesion, less alteration over time at high temperature and high humidity environments, no excessive increase in adhesive strength, and so forth.

Moreover, a problem of inhibiting the adhesive from being gelled due to ionic compounds may also be overcome, thus considerably decreasing a curing period while improving productivity.

While the present disclosure has been described with respect to the specific embodiments, it will be apparent to those skilled in the art that various changes and modifications may be made without departing from the spirit and scope of the disclosure as defined in the following claims.

What is claimed is:
1. An adhesive composition, comprising:
a vinyl-acrylate copolymer comprising a hydroxyalkylvinylether monomer represented by the following Formula 1 as a repeating unit:

[Formula 1]
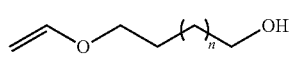

wherein n is an integer ranging from 1 to 10;
a cross-linking agent;
ionic solid; and
a silane coupling agent.

2. The adhesive composition according to claim 1, wherein the vinyl-acrylate copolymer is a copolymer of an alkyl (meth)acrylate monomer having 4 to 12 carbon atoms and the hydroxyalkylvinylether monomer represented by the Formula 1.

3. The adhesive composition according to claim 2, wherein the alkyl(meth)acrylate monomer having 4 to 12 carbon atoms is selected from the group consisting of n-butyl(meth) acrylate, 2-butyl(meth)acrylate, t-butyl(meth)acrylate, pentyl(meth)acrylate, octyl(meth)acrylate, 2-ethylhexyl(meth) acrylate, nonyl(meth)acrylate, decyl(meth)acrylate, lauryl (meth)acrylate, and a combination thereof.

4. The adhesive composition according to claim 2, wherein the alkyl(meth)acrylate monomer having 4 to 12 carbon atoms is selected from the group consisting of n-butylacrylate, 2-ethylhexylacrylate and a mixture thereof.

5. The adhesive composition according to claim 2, wherein a content of the alkyl(meth)acrylate monomer having 4 to 12 carbon atoms ranges from 80 to 99.9 wt. % relative to 100 wt. % of total monomers used for preparation of the vinyl-acrylate copolymer.

6. The adhesive composition according to claim 2, further comprising a polymeric monomer having a cross-linkable functional group.

7. The adhesive composition according to claim 6, wherein the polymeric monomer having the cross-linkable functional group is selected from the group consisting of a polymeric monomer having a carboxyl group, a polymeric monomer having an amide group, a polymeric monomer having a tertiary amine group, and a combination thereof.

8. The adhesive composition according to claim 6, wherein the polymeric monomer having the cross-linkable functional group is selected from the group consisting of (meth)acrylic acid, crotonic acid, maleic acid, itaconic acid, fumaric acid, monoalkylesters of dibasic acids, succinic anhydride ring-opening polyaddition products for 2-hydroxyalkyl (meth) acrylate having 2 or 3 carbon atoms, succinic anhydride ring-opening polyaddition products for polyoxyalkylene glycolmono(meth)acrylate having 2 or 4 carbon atoms, a compound obtained by ring-opening polyaddition of succinic anhydride to caprolactone polyaddition products for 2-hydroxyalkyl (meth)acrylate having 2 or 3 carbon atoms, (meth) acrylamide, N-isopropylacrylamide, N-tertiary butylacrylamide, N,N-dimethylaminoethyl (meth)acrylate, N,N-diethylaminoethyl methacrylate, N,N-dimethylaminopropyl acrylate and a combination thereof.

9. The adhesive composition according to claim 6, wherein the polymeric monomer having the cross-linkable functional group is included in a range from 0 to 10 wt. % relative to 100 wt. % of total monomers used for preparation of the vinyl-acrylate copolymer.

10. The adhesive composition according to claim 1, wherein the vinyl-acrylate copolymer has a weight average molecular weight of 50,000 to 2,000,000.

11. The adhesive composition according to claim 2, wherein the hydroxylalkylvinylether monomer represented by Formula 1 is contained in an amount of 0.1 to 10 wt. % relative to 100 wt. % of the vinyl-acrylate copolymer in terms of solid content.

12. The adhesive composition according to claim 1, wherein the hydroxylalkylvinylether monomer represented by Formula 1 is at least one selected from the group consisting of 4-hydroxybutylvinyleter, 5-hydroxypentylvinylether, 6-hydroxyhexylvinylether, 7-hydroxyheptylvinylether, 8-hydroxyoctylvinylether, 9-hydroxynonylvinylether and 10-hydroxydecylvinylether.

13. The adhesive composition according to claim 1, wherein the cross-linking agent comprises an isocyanate compound.

14. The adhesive composition according to claim 1, wherein the cross-linking agent comprises an isocyanate compound and an additional cross-linking agent selected from the group consisting of a melamine resin, a polyepoxy compound, an epoxy compound and a combination thereof.

15. The adhesive composition according to claim 1, wherein the cross-linking agent is contained in an amount of 0.1 to 15 wt. parts relative to 100 wt. parts of the vinyl-acrylate copolymer.

16. The adhesive composition according to claim 1, wherein the ionic solid has a melting point of at least 40° C.

17. The adhesive composition according to claim 1, wherein the ionic solid comprises a combination of an anion and a cation;
the anion of ionic solid is selected from a group consisting of imidazolium, pyridinium, alkylammonium, alkylpyrrolidium, alkyl phosphonium and a combination thereof; and
the cation of cation is selected from a group consisting of $Cl^-$, $Br^-$, $I^-$, $AlCl_4^-$, $Al_2Cl_7^-$, $BF_4^-$, $PF_6^-$, $ClO_4^-$, $NO_3^-$, $CO_3^{2-}$, $CH_3COO^-$, $CF_3COO^-$, $CH_3SO_3^-$, $CF_3SO_3^-$, $(CF_3SO_2)_2N^-$, $(CH_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, $C_6H_5COO^-$, $(CF_3SO_2)(CF_3CO)N^-$, $OTf^-$ (trifluoromethane sulphonate), $OTs^-$ (toluene sulphonate), $OMs^-$ (methane sulphonate), $BPh_4^-$ (tetraphenyl borate) and a combination thereof.

18. A polarizing plate having an adhesive layer comprising the adhesive composition as set forth in claim 1.

19. An adhesive composition, comprising:
a vinyl-acrylate copolymer comprising a hydroxyalkylvinylether monomer represented by the following Formula 1 as a repeating unit and an alkyl(meth)acrylate monomer having 4 to 12 carbon atoms:

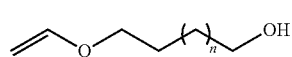

[Formula 1]

wherein n is an integer ranging from 1 to 10 and the hydroxylalkylvinylether monomer represented by Formula 1 is contained in an amount of 0.1 to 10 wt. % relative to 100 wt. % of the vinyl-acrylate copolymer;
a cross-linking agent comprising an isocyanate compound;
ionic solid having a melting point of at least 40° C.;
a silane coupling agent; and
a polymeric monomer having a cross-linkable functional group.

* * * * *